United States Patent [19]

Ichikawa et al.

[11] Patent Number: 4,933,531

[45] Date of Patent: Jun. 12, 1990

[54] PANTOGRAPH TYPE ROBOT ARM

[75] Inventors: Hiroo Ichikawa, Aichi; Motoichi Nakayama; Hisanori Nakamura, both of Toyota, all of Japan

[73] Assignees: Toyota Jidosha Kabushiki Kaisha; Kyoho Machine Works, Ltd., both of Japan

[21] Appl. No.: 372,004

[22] Filed: Jun. 27, 1989

[30] Foreign Application Priority Data

Jul. 22, 1988 [JP] Japan ................ 63-183964

[51] Int. Cl.$^5$ ............................................. B23K 11/30
[52] U.S. Cl. ................................. 219/86.25; 901/42
[58] Field of Search ................. 219/86.25, 89; 901/42

[56] References Cited

U.S. PATENT DOCUMENTS 4,438,309  3/1984  Zimmer ........................... 219/86.25

FOREIGN PATENT DOCUMENTS

| 60-6369 | 1/1985 | Japan . |
| 60-238295 | 11/1985 | Japan . |
| 61-14888 | 1/1986 | Japan . |
| 61-65790 | 4/1986 | Japan . |
| 62-28104 | 2/1987 | Japan . |
| 62-28193 | 2/1987 | Japan . |
| 591281 | 2/1978 | U.S.S.R. ........................... 219/86.25 |

*Primary Examiner*—Clifford C. Shaw
*Attorney, Agent, or Firm*—Finnegan, Henderson, Farabow, Garrett & Dunner

[57] ABSTRACT

A pantograph type robot arm having a linkage for connecting a movable member such as a movable welding electrode to a support member. The pantograph type robot arm includes two blocks supported by the support member movably in a direction perpendicular to a straight line, toward and away from each other in a symmetric manner with respect to the straight line. The linkage includes a pair of proximal link bars pivotally connected to the blocks such that the proximal link bars are pivotally connected to each other at their intermediate portions, and a pair of distal link bars pivotally connected to the movable member and to the proximal link bars so that the movable member is moved relative to the support member when the two blocks are moved relative to each other. A pivoting mechanism is provided in pivotal connection to one of the distal link bars of the linkage and the movable member, for effecting a relative pivotal movement of the one distal link bar and the movable member, by an angle equal to an angle of pivotal movements of the one distal link bar, in a direction opposite to a direction of the pivotal movements of the one distal link bar.

16 Claims, 13 Drawing Sheets

PANTOGRAPH TYPE ROBOT ARM

BACKGROUND OF THE INVENTION

1. Field of the Invention

The present invention relates in general to a robot arm of a pantograph type, and more particularly to a technique for stabilizing the direction of movement and the operating posture of a movable member attached to the free end of a linkage of the robot arm.

2. Discussion of the Prior Art

In the art of industrial robots, there is known a pantograph type, expandable robot arm which has a plurality of rigid link bars linked together in a parallelogram form, and which is expaned and contracted in a direction along a straight line. An example of such a pantograph type robot arm is disclosed in laid-open Publication No. 60-6369 of unexamined Japanese Patent Application. The parallelogram linkage of the robot arm carries a movable member pivotally attached to its distal or free end for effecting a desired operation such as a welding operation. While the parallelogram linkage is pivotally supported at its proximal or fixed end by a suitable stationary support member or structure, the operating posture of the movable member during movement thereof due to expansion or contraction of the linkage is not sufficiently stable. Accordingly, the path of movement taken by the movable member may more or less deviate from the nominal straight path. Further, the pivotal connection of the movable member to the distal link bars of the parallelogram linkage tends to lead to instability of maintaining the movable member in its predetermined posture, which may result in positioning accuracy of the movable member that is not acceptable in some applications of the robot.

In the light of the above, it is considered possible to provide suitable guiding means for guiding the movable member along the desired nominal straight path, while maintaining the predetermined posture. This arrangement is necessarily complicated, and suffers from an interference of the guide means with the other members when the parallelogram linkage is contracted, with a guide member or members of the guiding means projecting beyond the support structure. Accordingly, the operation of the robot or the operating range or area of the robot arm or movable member is more or less limited.

SUMMARY OF THE INVENTION

It is therefore an object of the present invention to provide a robot arm wherein the movable member pivotally attached to the free end of the parallelogram linkage can be moved accurately following a nominal path while maintaining its predetermined operating posture, without using guiding means that may interfere with the other members of the arm.

The above object may be achieved according to the principle of the present invention, which provides a pantograph type robot arm having a plurality of link bars linked together so as to be expanded and contracted in a direction along a straight line, comprising: (a) a support member; (b) a pair of driving blocks which are supported by the support member movably in a direction perpendicular to the straight line, toward and away from each other, such that the driving blocks are positioned symmetrically with each other with respect to the straight line during movements thereof; (c) a linkage having the plurality of link bars, the plurality of link bars comprising a pair of proximal link bars and a pair of distal link bars, each of the proximal link bars being connected at one end thereof to a corresponding one of the pair of driving blocks such that the proximal link bars are pivotable about respective first pivot axes which are perpendicular to the direction of movements of the driving blocks and perpendicular to the straight line, the proximal link bars being connected at intermediate portions thereof to each other pivotally relative to each other about a second pivot axis parallel to the first pivot axes, each of the distal link bars being pivotally connected at one end thereof directly or indirectly to a corresponding one of the other ends of the proximal link bars, respectively, the other ends of the distal link bars being moved toward and away from the support member in the direction along the straight line, when the pair of driving blocks are moved toward and away from each other; (d) a movable member connected to the other ends of the pair of distal link bars of the linkage, pivotally about at least one third pivot axis parallel to the first pivot axes; and (e) a pivoting mechanism associated with one of the distal link bars of the linkage and the movable member, for effecting a relative pivotal movement of the one distal link bar and the movable member about one of the above-indicated at least one third pivot axis, by an angle equal to an angle of pivotal movements of the one distal link bar about the one third pivot axis, in a direction opposite to a direction of the pivotal movements of the one distal link bar.

In the pantograph type robot arm of the present invention constructed as described above, the movable member attached to the distal link bars of the linkage is reciprocated along the straight line, when the linkage whose proximal link bars are connected to the driving blocks is expanded and contracted along the straight line as the driving blocks are moved toward and away from each other. In the presence of the pivoting mechanism associated with the linkage and the movable member, there arises a relative pivotal movement between the distal link bars and the movable member, about the third pivot axis or axes, by the same angle as the distal link bars about the third axis or axes, in the direction opposite to the direction of pivotal movement of the distal link bars. As a result, the movable member is reciprocated along the straight line, without changing its operating posture.

Accordingly, the movable member can be accurately positioned to a desired or predetermined location at which a certain operation is performed. Thus, the instant pantograph robot arm may be suitably used for various industrial robots that require high positioning accuracy. Further, the absence of any guiding means for guiding the movable member contributes to simplification of the construction of the robot arm, and eliminates interferences or collision between the guiding means and the other members of the robot arm, which may occur when a guide member or members project beyond the support member upon contraction of the linkage. In other words, the operation of the robot or the operating range of the robot arm will not be limited by such guiding means.

The pivoting mechanism may include a plurality of auxiliary link bars associated with at least one of the driving blocks, the linkage and the movable member, such that the auxiliary link bars are disposed parallel to respective ones of the proximal and distal link bars of the linkage. For instance, the pivoting mechanism includes a first auxiliary link bar connected at one end thereof to one of the pair of driving blocks, a second auxiliary link bar connected at one end thereof to the movable member, and a connecting lever which is pivotally supported by the other end of one of the pair of proximal link bars. In this case, the first auxiliary link bar is pivotally connected at the other end thereof to one end of the connecting lever while the second auxiliary link bar is pivotally connected at the other end thereof to the other end of the connecting lever, such that the first auxiliary link bar is parallel to the above-indicated one proximal link bar of the pair of proximal link bars while the second auxiliary link bar is parallel to one of the pair of distal link bars to which the above-indicated one proximal link bar is pivotally connected. However, the pivoting mechanism may be a gearing mechanism which consists of a first gear rotatably attached to the end of one of the proximal link bars, a second gear which has the same number of teeth as the first gear and which is rotatably attached to the movable member, and an odd number of intermediate idler gears rotatably supported by one of the distal link bars which corresponds to the above-indicated one proximal link bar having the first gear. This gearing mechanism may be replaced by a belt-and-pulley mechanism, by substituting pulleys for the first and second gears, and a belt for the idler gears.

Where it is required to supply electric power to the movable member for achieving a desired operation, the robot arm may be provided with a pair of electrically conductive bars, which are electrically and pivotally connected at one end thereof to each other, and at the other ends thereof to the support member and the movable member, respectively, so that an electric current is applied to the movable member through the pair of electrically conductive bars.

The linkage of the instant robot arm may be expanded and contracted in any desired direction along a straight line path. However, it is preferable that the straight line path extends substantially in the vertical direction and that the movable member is moved away from the support member in the downward direction. In this case, the expansion and contraction of the linkage take place in the direction of gravity, and this is beneficial in terms of the mechanical strength and operational smoothness of the robot arm.

In the above form of the invention wherein the linkage is suspended from the support member so as to be expanded in the vertically downward direction, the robot arm is protected against excessive compressive and tensile forces. Therefore, this arrangement is desirable where the movable member has a presser cylinder adapted such that the output rod of the presser cylinder is moved in the downward direction, for applying a pressure to a workpiece. Namely, the reaction force produced when the output rod of the cylinder pushes the workpiece can be suitably received by the linkage and the support member. Therefore, the present arrangement does not suffer from reduction in the pressing force applied to the workpiece, or dislocation of the movable member relative to the workpiece during pressing of the workpiece, which may occur on a multi-joint robot arm which uses a plurality of arm members that are pivotally connected in series.

Any instrument or device for performing a desired operation may be attached to or mounted on the movable member of the robot arm. Where a presser cylinder for pressing the workpiece is attached to the movable member, for example, the presser cylinder is preferably arranged such that the output rod of the cylinder is substantially alignable with the straight line along which the linkage is expanded. In this case, the output rod applies a pressure to the workpiece in the direction substantially parallel to the straight line. However, the robot arm is preferably equipped with suitable means for pivoting the cylinder about an axis lying on and perpendicular to the straight line, so that the output rod is pivotable over a predetermined angular range in a plane which includes the straight line and which is perpendicular to the first pivot axes. In this case, the direction in which the workpiece is pressed by the presser cylinder can be changed.

Where the robot arm is used for a welding operation, the robot arm may include a movable electrode fixed to the output rod of the presser cylinder, and a stationary electrode which cooperates with the movable electrode to grip the workpiece therebetween, during the welding operation on the workpiece. In this case, the electrically conductive bars described above may be suitably used to energize the movable and stationary electrodes.

The support member may be fixed in position. In this instance, the movable member is movable in only one direction, i.e., in the direction parallel to the straight line indicated above. For increasing the versatility of the robot arm, it is advantageous to provide suitable rotary drive means for rotating the support member about the straight line, and linear drive means for moving the support member in a direction perpendicular to the straight line, or linear drive means for moving the support member in mutually perpendicular directions in a plane perpendicular to the straight line. Alternatively, suitable means may be provided for rotating the support member about an axis which is parallel to but is offset from the straight line, and for moving the support member in a direction perpendicular to the straight line. The provision of rotary drive means as indicated above is beneficial where the instrument or device disposed on the movable member such as the presser cylinder or movable electrode is movable relative to the above-indicated straight line. For instance, the output rod of the presser cylinder may be adapted to be pivotable or swingable about an axis perpendicular to the straight line.

The pair of driving blocks may be moved by suitable drive means. For example, the drive means includes a pair of externally threaded shafts which extend in the direction perpendicular to the straight line and which engage the pair of driving blocks, respectively, and means for rotating the externally threaded shafts in opposite direction at a same speed. Alternatively, the drive means includes a feedscrew which extends in the direction perpendicular to the straight line and which has two spaced-apart right-hand and left-hand threaded portions engaging the pair of driving blocks, respectively. The feedscrew may be bidirectionally rotated by a suitable drive source such as an electric motor.

The pair of distal link bars of the linkage may be pivotally connected to the movable member by suitable means such as a pair of pins, which provide two pivot axes as the third pivot axes indicated above. However, a single pin may be used to pivotally connect the pair of distal link bars to the movable member. In this case, the single pin provides one third pivot axis.

Although the linkage may consist of at least one pair of proximal link bars and at least one pair of distal link bars, it is desirable that the linkage consist of two or more pairs of proximal link bars each pair constructed as defined in claim 1, and two or more pairs of distal link bars each pair constructed as defined in claim 1. When two pairs of proximal link bars and two pairs of distal link bars are provided, the two pairs of proximal link bars are spaced apart from each other in a direction parallel to the first pivot axes, and the two pairs of the distal link bars are spaced apart from each other in the direction parallel to the first pivot axes. The two pairs of proximal link bars may be pivotally connected to the driving blocks and directly connected to the two pairs of distal link bars, with the two pairs of distal link bars being pivotally connected to the movable member.

BRIEF DESCRIPTION OF THE DRAWINGS

The above and other objects, features and advantages of the present invention will be better understood by reading the following detailed description of presently preferred embodiments of the invention, when considered in connection with the accompanying drawings, in which.

DETAILED DESCRIPTION OF THE PREFERRED EMBODIMENTS

Figure 1:
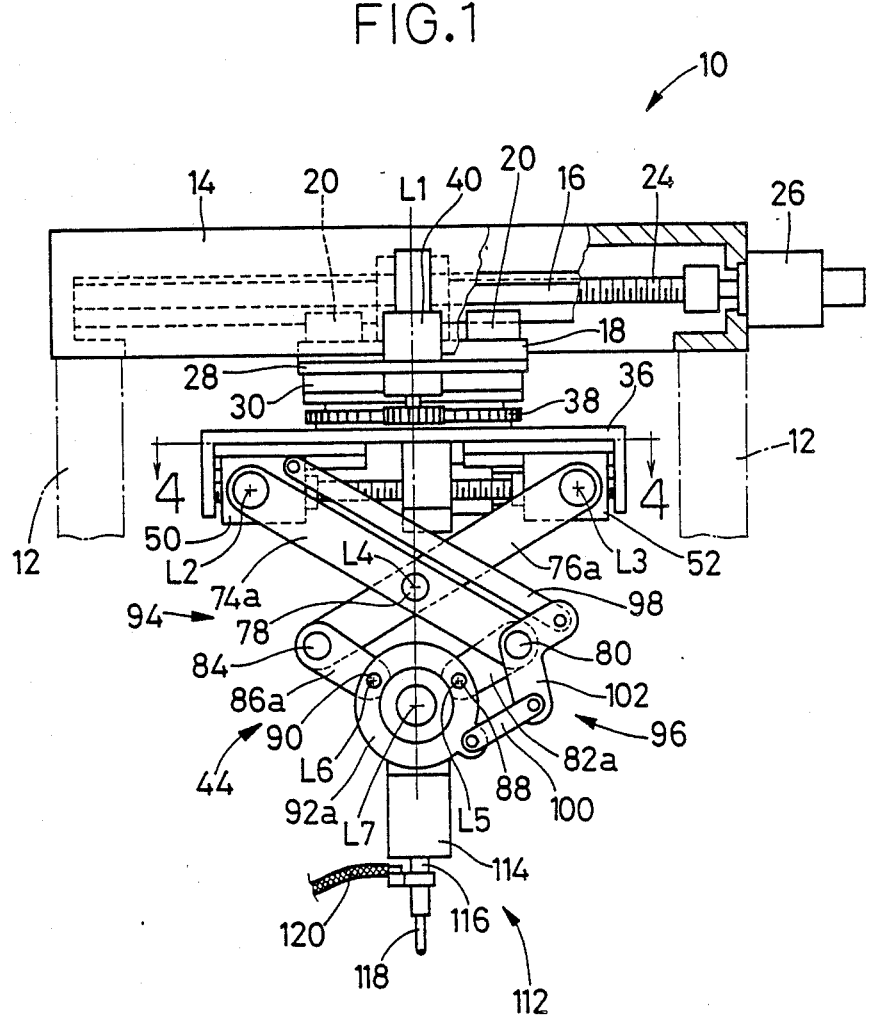
FIG. 1 is a partially cut-away front elevational view of one embodiment of a pantograph type robot arm of the present invention.
Figure 2:
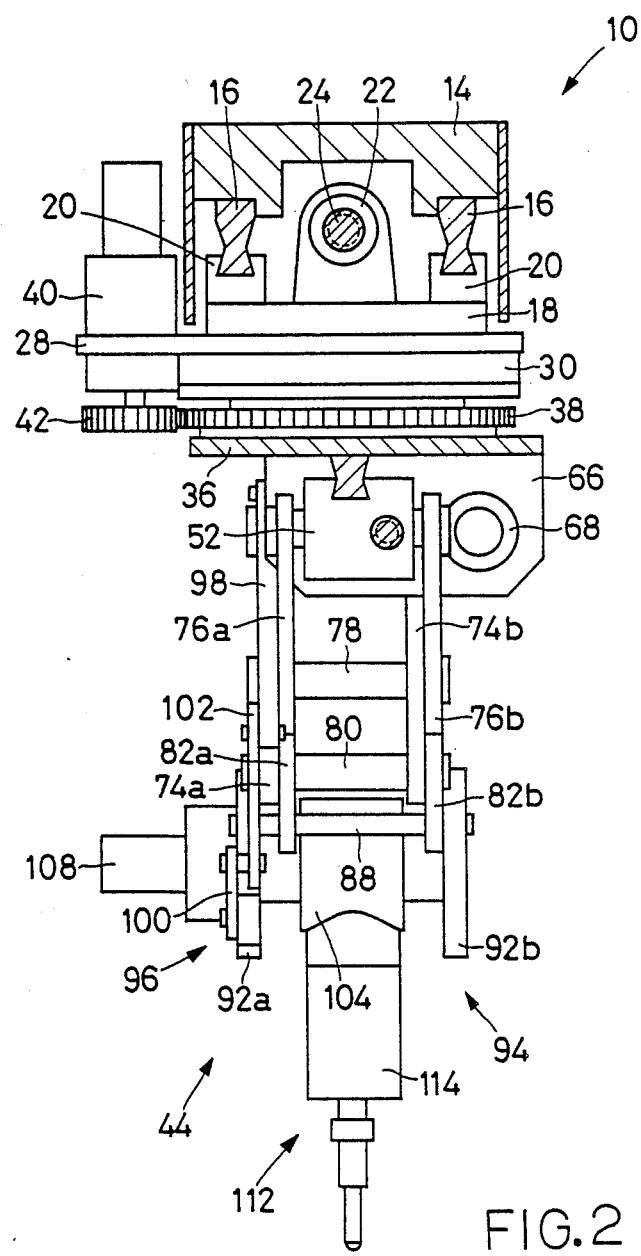
FIG. 2 is a right-hand side elevational view of the robot arm of FIG. 1.

Referring first to the front elevational view of FIG. 1 and the side elevational view of FIG. 2, reference numeral 10 generally denotes a spot-welding robot equipped with a pantograph type robot arm indicated at 44. The robot 10 is supported by a pair of parallel main frames 12 on which is secured a support structure 14 so as to extend substantially in the horizontal plane. As shown in FIG. 2, the support structure 14 has a pair of parallel linear guides 16 fixed thereto, and a slide table 18 is slidably mounted on the linear guides 16 through bearings 20, so that the slide table 18 is movable in a substantially horizontal direction. The slide table 18 has a nut 22 which engages a ballscrew 24 which is bidirectionally rotated by a drive source in the form of a drive motor 26, so that the table 18 is reciprocated by a bidirectional operation of the motor 26, through the nut 22 and the ballscrew 24, while being linearly guided by the linear guides 16.

The slide table 18 has a support plate 28 fixed to its underside, and an annular mount 30 secured to the support plate 28. As shown in enlargement in the cross sectional view of FIG. 3, the annular mount 30 has a mounting plate 34 which is supported via a bearing 32 such that the plate 34 is rotatable about an axis L1 (FIG. 1) which extends in a substantially vertical direction. On the mounting plate 34, there are fixedly mounted a support member in the form of a rotary table 36, and a gear 38 secured to the rotary table 36 in a coaxial relation with the table 36. The gear 38 meshes with a gear 42 fixed to the output shaft of a drive motor 40 secured to the support plate 28. With the gear 42 bidirectionally rotated by the motor 40, the rotary table 36 is bidirectionally rotated about the substantially vertical axis L1.

Figure 4:
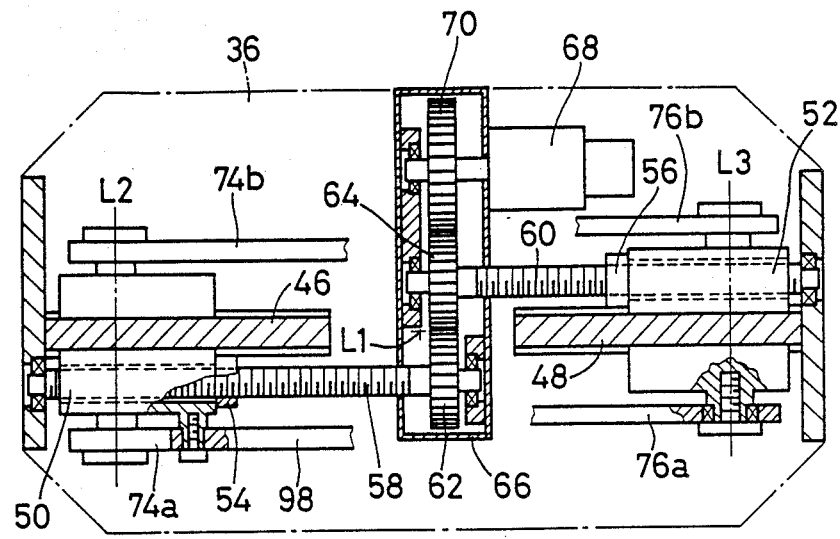
FIG. 4 is a cross sectional view taken along line IV—IV of FIG. 1.

The rotary table 36 functions as a support member for supporting the pantograph type robot arm 44, which extends downward. As described below in greater detail, the robot arm 44 is adapted to be expanded and contracted along the rotation axis or centerline L1 of the rotary table 36, i.e., along the straight line L1 which passes the center of the table 36. As indicated in the cross sectional view of FIG. 4 taken along line IV—IV of FIG. 1, the rotary table 36 has a pair of linear guides 46, 48 fixed to its underside such that the two linear guides 46, 48 are alinged in line with each other on a straight line which is perpendicular to the rotation axis or center L1. The linear guides 46, 48 are disposed symmetrically with each other with respect to the centerline L1. A pair of driving blocks 50, 52 each incorporating a suitable bearing slidably engage the respective linear guides 46, 48.

The driving blocks 50, 52 have respective nuts 54, 56 which engage respective ballscrews 58, 60, such that the driving blocks 50, 52 are positioned symmetrically with each other with respect to the centerline or rotation axis L1 of the rotary table 36. The ballscrews 58, 60, which are rotatably supported by the rotary table 36, have respective gears 62, 64 fixed at their corresponding ends. The gears 62, 64 have the same number of teeth, and mesh with each other in a gear box 66. The gear 64 of the ballscrew 60 meshes with a gear 70 fixed to the output shaft of a drive source in the form of a drive motor 68. With the gear 70 bidirectionally rotated by the drive motor 68, the gears 62, 64 (and the ballscrews 58, 60) are rotated at the same speed, but in the opposite directions, whereby the two driving blocks 50, 52 engaging the ballscrews 58, 60 are moved toward and away from each other while being guided by the linear guides 46, 48, such that the driving blocks 50, 52 are positioned symmetrically with each other with respect to the centerline L1. It will be understood that "L1" represents the centerline or rotation axis of the rotary table 36 (support member for the robot arm 44), or the straight line along which the robot arm 44 expands and contracts, where appropriate or as necessary.

The pantograph type robot arm 44 has two proximal link bars 74a, 74b associated with one of the two driving blocks 50, 52, and two proximal link bars 76a, 76b associated with the other driving block. More specifically, the proximal link bars 74a, 74b are connected via respective bearings to the opposite sides of the driving block 50, pivotally about a pivot axis L2 which is perpendicular to the centerline L1 and to the direction of movement of the block 50. Similarly, the proximal link bars 76a, 76b are connected via respective bearings to the opposite sides of the driving block 52, pivotablly about a pivot axis L3 which is also perpendicular to the centerline L1 and perpendicular to the direction of movement of the driving block 52. The proximal link bars 74a, 76a pivotally connected to the corresponding sides of the two driving blocks 50, 52 intersect each other at their intermediate points which lies on the centerline L1, in a plane which is parallel to the direction of movements of the driving blocks 50, 52 and which includes the centerline L1. The link bars 74a, 76a are pivotally connected to each other at that intersection point by a pin 78 parallel to the pivot axes L2, L3. The pixot axes L2, L3 will be referred to as "first pivot axes L2, L3", and the centerline of the pin 78 will be referred to as a "second pivot axis L4".

Figure 5:
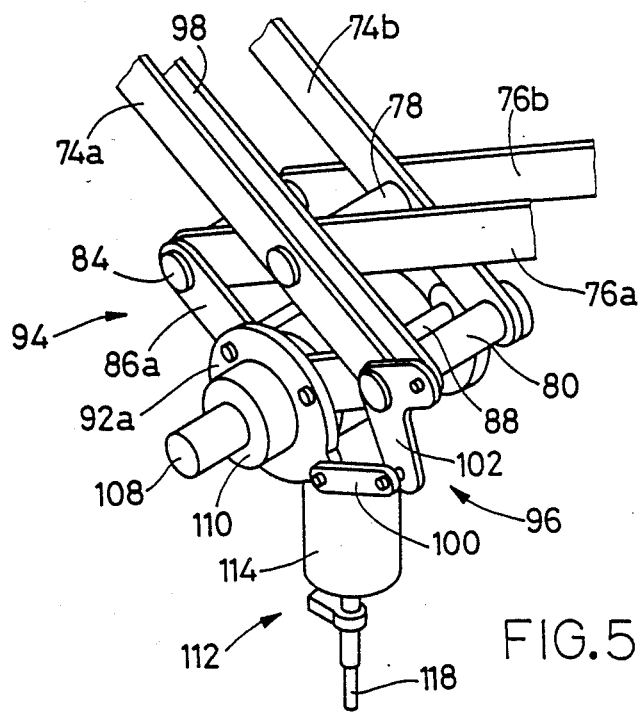
FIG. 5 is a fragmentary perspective view showing a distal portion of the robot arm of FIG. 1.

Similarly, the link bars 74b, 76b associated with the other corresponding sides of the blocks 50, 52 are connected by the pin 78 pivotally about the second pivot axis L4, as shown in FIG. 5.

The corresponding ends of the proximal link bars 74a, 74b which are remote from the block 50 are pivotally connected to respective distal link bars 82a, 82b, by a pin 80 parallel to the first pivot axis L2, as most clearly shown in FIG. 2. Similarly, the corresponding ends of the proximal link bars 76a, 76b which are remote from the block 52 are pivotally connected to respective distal link bars 86a, 86b, by a pin 84 parallel to the first pivot axis L3, as most clearly shown in FIG. 6. The proximal link bars 74a, 74b, and 76a, 76b have the same length, and the pins 80, 84 are positioned symmetrically with each other with respect to the centerline L1, for pivotally connecting the proximal and distal link bars 74a, 74b, 76a, 76b and 82a, 82b, 86a, 86b. Also, the distal link bars 82a, 86a, and 82b, 86b have the same length, and are connected to respective mounting plates 92a, 92b, pivotally about pins 88, 90 parallel to the first pivot axes L2, L3, at their ends remote from the pins 80, 84. The distal link bars 82a, 82b, 86a, 86b engage the pins 80, 84, 88, 90 via suitable bearings.

Figure 7:
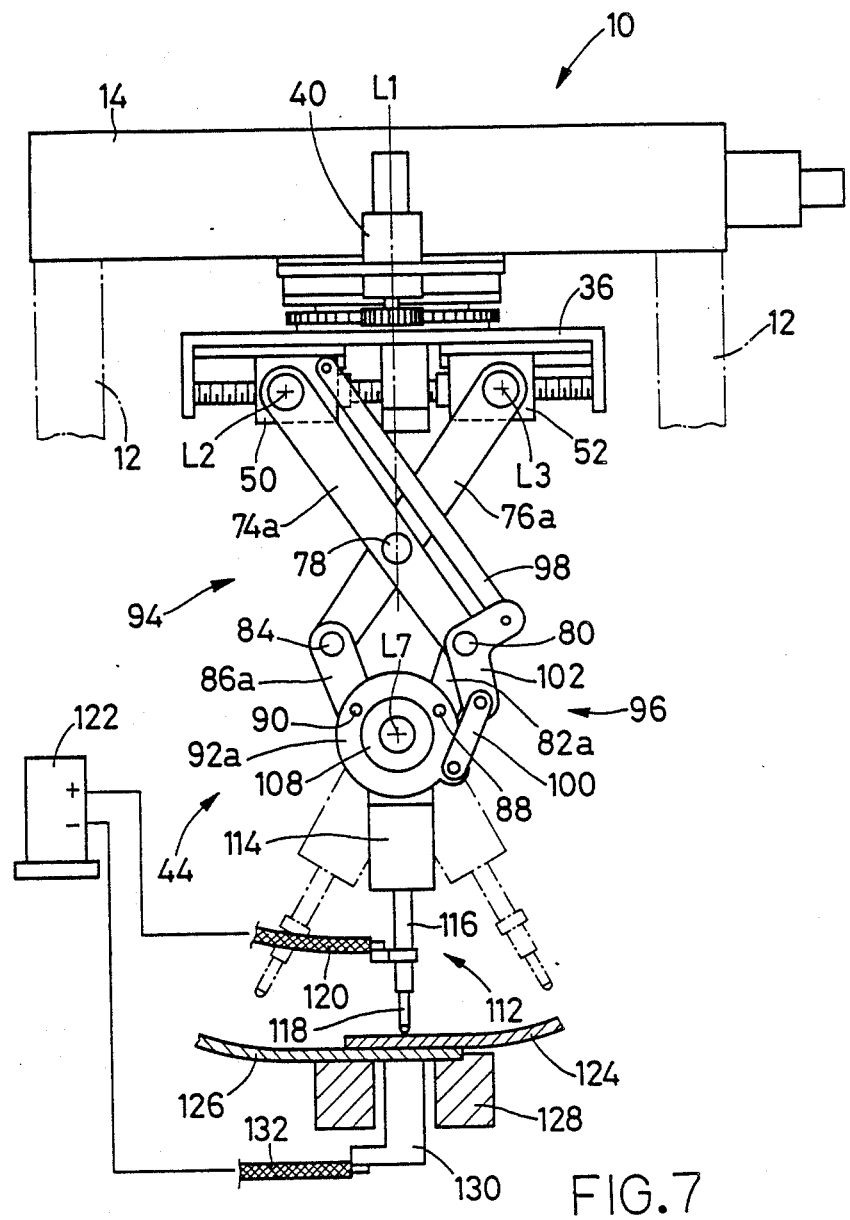
FIG. 7 is a front elevational view of the robot arm of FIG. 1 placed in its expanded position.

The proximal link bars 74a, 74b, 76a, 76b, and the distal link bars 82a, 82, 86a, 86b, which are linked together as described above, cooperate with each other to form a parallelogram linkage 94 of the pantograph type robot arm 44. With the driving blocks 50, 52 moved toward and away from each other in a mutually symmetric relation with respect to the centerline L1, the parallelogram linkage 94 is expanded and contracted in the vertical direction along the straight line L1, whereby the mounting plates 92a, 92b pivotally connected to the distal link bars 82a, 82b, 86a, 86b of the linkage 94 are linearly reciprocated in the vertical direction. The mounting plates 92a, 92b function as a movable member as distinguished with the support member 36 (rotary table), and the centerlines of the pins 88, 90 define third pivot axes L5, L6, respectively. The distal end portion of the parallelogram linkage 94 is shown in perspective in FIG. 5, and the right-hand side cross sectional view of the mounting plates 92a, 92b is provided in 6. It is noted that the linkage 94 as shown in FIG. 1 is placed in its contracted position, while the linkage 94 as shown in FIG. 7 is placed in its expanded position.

The parallelogram linkage 94 is provided with a pivoting mechanism 96 adapted to maintain the position of the mounting plate 92a (movable member) while permitting the plate 92a to be vertically reciprocated. As is apparent from FIGS. 1 and 7, the pivoting mechanism 96 includes a first auxiliary link bar 98 having the same length as the proximal link bar 74a, and a second auxiliary link bar 100 having the same length as the distal link bar 82a. The first and second auxiliary link bars 98, 100 extend parallel to the proximal and distal link bars 74a, 82a, substantially in a plane perpendicular to the first pivot axis L2. Described in detail, the first auxiliary link bar 98 is connected at its one end to the driving block 50, pivotally about an axis parallel to the pivot axis L2, and at its other end to one end of a generally L-shaped connecting lever 102, pivotally about an axis parallel to the pivot axis L2. The connecting lever 102 is pivotally supported by the pin 80, which pivotally connects the proximal and distal link bars 74a, 82a. On the other hand, the second auxiliary link bar 100 is connected at its opposite ends to the other end of the connecting lever 102, and the mounting plate 92a, pivotablly about axes parallel to the first pivot axis L2. These auxiliary link bars 98, 100 may be referred to as "parallel link bars", since they are parallel to the proximal and distal link bars 74a, 82a associated with the driving block 50 and the mounting plate 92a.

In the pivoting mechanism 96, a pivotal movement of the proximal link bar 74a about the first pivot axis L2 upon a linear movement of the driving block 50 will cause the connecting lever 102 to be pivoted relative to the proximal link bar 74a about the pin 80, by an angle equal to that of the pivotal movement of the link bar 74a, in a direction opposite to the direction of the pivotal movement of the link bar 74a. As a result, the connecting lever 102 is translated between the positions of FIGS. 1 and 7, without changing its posture. In the meantime, the distal link bar 82a is pivoted about the pin 80. Consequently, the mounting plate 92a pivotally connected to the connecting lever 102 via the distal and second auxiliary link bars 82a, 100, and the distal link bar 82a are pivoted relative to each other, by an angle equal to that of the pivotal movement of the link bar 82a, in a direction opposite to the direction of the pivotal movement of the link bar 82a. As a result, the mounting plate 92a is reciprocated in the vertical direction while maintaining its predetermined posture, as the driving block 50 is reciprocated. The mounting plate 92b which is connected to the mounting plate 92a through the pins 88, 90 and a swing shaft 104 is vertically reciprocated with the mounting plate 92a, while the posture of the plate 92b is maintained.

Figure 6:
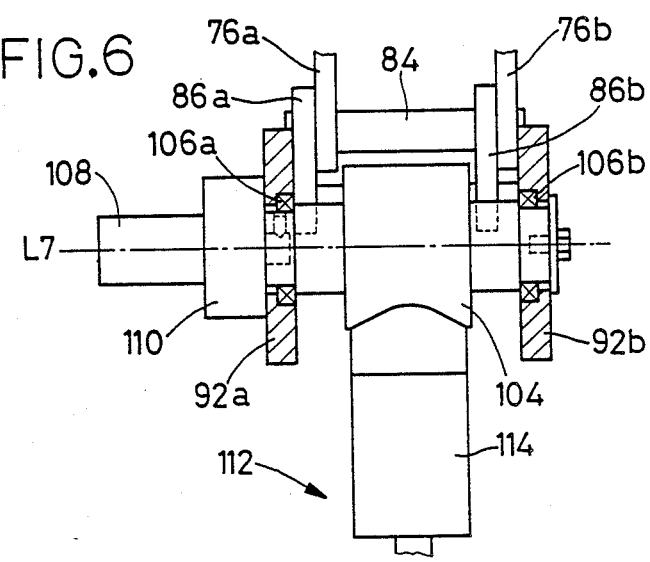
FIG. 6 is a cross sectional view of the distal portion of the arm of FIG. 1.

As shown in FIG. 6, the swing shaft 104 is connected to the mounting plates 92a, 92b (movable member) via respective bearings 106a, 106b, pivotally about a pivot axis L7 perpendicular to the centerline L1. The swing shaft 104 is operatively connected through a speed reduction gear 110 to a drive motor 108 secured to the mounting plate 92a, so that the swing shaft 104 is bidirectionally pivoted about the axis L7 by the drive motor 108. The swing shaft 104 carries a welding stud gun 112 secured thereto such that the stud gun 112 extends in a direction perpendicular to the pivot axis L7, and so that the stud gun 112 is pivoted with the swing shaft 104, over a suitable angular range as indicated in one-dot chain line in FIG. 7, in a plane which includes the centerline L1 and which is perpendicular to the pivot axis L7. The pivoting angular range is determined such that the gun 112 placed in its fully swung positions extends generally downwardly with respect to the movable member 92a, 92b.

The stud gun 112 includes a reciprocating presser cylinder 114, and a movable upper electrode 118 attached to the end of an output rod 116 of the cylinder 114. The stud gun 112 is fixed at its upper end to the swing shaft 104. The movable electrode 118 is connected by a cable 120 to a positive (+) terminal of a welding transformer 122, as indicated in FIG. 7. Workpieces 124, 126 which are to be welded together by the spot-welding robot 10 are positioned on a positioning jig 128 disposed below the movable electrode 118. As shown in FIG. 7, a stationary lower electrode 130 is held in contact with the underside of the workpiece 126, such that the movable and stationary electrodes 118, 126 cooperate to grip the partially superposed workpieces 124, 126. The stationary electrode 130 is connected by a cable 132 to a negative (−) terminal of the welding transformer 122.

In the thus constructed spot-welding robot 10, the drive motors 26, 40, 68 and 108 are operated under the control of a suitable control apparatus, so that the stud gun 112 is positioned right above the welding portion of the workpieces 124, 126. In the illustrated example of FIG. 7, a welding operation is effected while the stud gun 112 is held in a substantially vertical position. In this condition, the presser cylinder 114 is activated to push down the output rod 116, for forcing the movable electrode 118 against the workpieces 124, 126 while the stationary electrode 130 is held in pressing contact with the workpieces. In this specific example wherein the gun 112 positioned by the swing shaft 104 extends downward in the vertical direction, the rotary table 36 need not be rotated to position the gun 112 at the welding position on the workpieces 124, 126. Where the gun 112 extends obliquely downwardly as indicated in one-dot chain line in FIG. 7, the rotary table 36 (support member for the robot arm 44) must be rotated about the rotation axis L1, as needed, so that the gun 112 is aligned with the welding portion of the workpieces 124, 126. In the present embodiment, the length of the weldable range of the robot 10 is determined by an operating stroke of the slide table 18 and an angular pivoting range of the gun 112 (in the plane of FIG. 7), and the width of the weldable range is determined by the angular pivoting range of the gun 112 (in the plane perpendicular to that of FIG. 7).

The welding stud gun 112 attached to the movable member in the form of the mounting plates 92a, 92b is lowered to the welding position by the expanding movement of the pantograph type robot arm 44 which uses the parallelogram linkage 94. Since the pivoting mechanism 96 permits the movable member 92a, 92b to be reciprocated exactly along the straight line L1, without changing its posture, the stud gun 112 attached to the movable member 92a, 92b via the swing shaft 104 can be positioned accurately at the lowered welding position, when the robot arm 44 is expanded. As a result, the movable electrode 118 can be aligned accurately with the stationary electrode 130, with the output rod 116 of the presser cylinder 114 placed in its advanced position. Further, since the robot arm 44 is expaned in the direction of gravity, the robot arm 44 is protected from an excessive load due to weights of the arm and gun 44, 112, and the gun 112 can be smoothly lowered to the welding position. This arrangement is advantageous in terms of the mechanical strength.

The workpieces 124, 126 are pressed by the presser cylinder 114, with a force usually on the order of several hundreds of kgf, up to as high as about 700 kgf in some cases. In an ordinary multi-joint robot arm which has a plurality of arm members that are pivotally connected in series, an excessive moment load in the reverse direction is exerted to the pivotal joints when the movable electrode is forced against the workpiece. This may cause an insufficient pressing force agaitnt the workpiece, or misalignment or mislocation of the movable electrode relative to the workpiece. In the present welding robot 10, however, the reaction force of the pressing force of the presser cylinder 114 acts on the pivotal joints or connections of the parallelogram linkage 94, as tensile or compressive loads which are eventually received by the main frames 12. Therefore, the instant robot arm 44 does not suffer from insufficiency of the pressing force of the cylinder 114, or misalignment or dislocation of the movable electrode 118. It is particularly noted that the parallelogram linkage 94 consists of the two pairs of proximal link bars 74a, 76a, and 74b, 76b, and the two pairs of distal link bars 82a, 86a, and 82b, 86b, as described above. This arrangement assures improved stability in maintaining the posture of the stud gun 112, and increased mechanical strength of the linkage 94 sufficient to withstand the reaction force produced when the gun 112 is forced against the workpieces 124, 126. Further, the robot 10 using the suspension type robot arm 44 is advantagous in that the reaction force of the workpiece pressing force is reduced by its own weight. This advantage may be offered where the robot arm 44 is used for other robots such as a robot for clamping a workpiece to a stationary member.

When a welding electric current is applied from the welding transformer 122 to the movable and stationary electrodes 118, 130 in the condition of FIG. 7, the current flows through the workpieces 124, 126 from the movable electrode 118 to the stationary electrode 130, whereby heat is produced due to an electrical resistance between the workpieces 124, 126, and the workpieces are welded together by fusion. After completion of the welding operation, the supply of the electric current is cut off, and the output rod 116 of the presser cylinder 114 is retracted to move the movable electrode 118 away from the welded workpieces 124, 126. Then, the drive motors 26, 40, 68, 108 are operated as needed, to position the stud gun 118 to another welding position on the workpieces 124, 126. Thus, a spot welding operation is repeatedly accomplished by the welding robot 10.

It will be understood from the above description that the present welding robot 10 is adapted to reciprocate the stud gun 112 in the vertical direction by using the pantograph type robot arm 44, while the mounting plates 92a, 92b carrying the gun 112 is linearly reciprocated exactly along the straight line L1, without their operating posture being changed during the reciprocation. Thus, the stud gun 112 can be positioned at the predetermined welding positions, with improved accuracy, which assures enhanced welding accuracy of the robot 10.

Furthermore, the welding robot 10 does not use an elongate guide member for guiding the mounting plates 92a, 92b (movable member) so as to maintain their posture, the robot 10 can be made relatively simple and compact in construction, and the operation of the robot 10 is not disturbed or limited by such a guide member. For example, the guide member is constituted by a guide rod which is connected at its lower end to the mounting plate 92a and axially slidably engages a guide bushing at its upper end. The guide bushing is secured to the rotary table 36 (support member). In this case, however, the guide bar extends upwardly beyond the rotary table 36 and may interfere with the other members of the robot 10, when the parallelogram linkage 94 is in the contracted position of FIG. 1. Thus, the operation of the robot 10 is limited by such a guide member.

Some modified embodiments of the invention will be described, referring to FIGS. 8-17. In these figures, the same reference numerals as used in the above embodiment of FIGS. 1-7 will be used to identify the functionally corresponding components, and no redundant description of these components will be provided in the interest of brevity and simplification.

Figure 8:
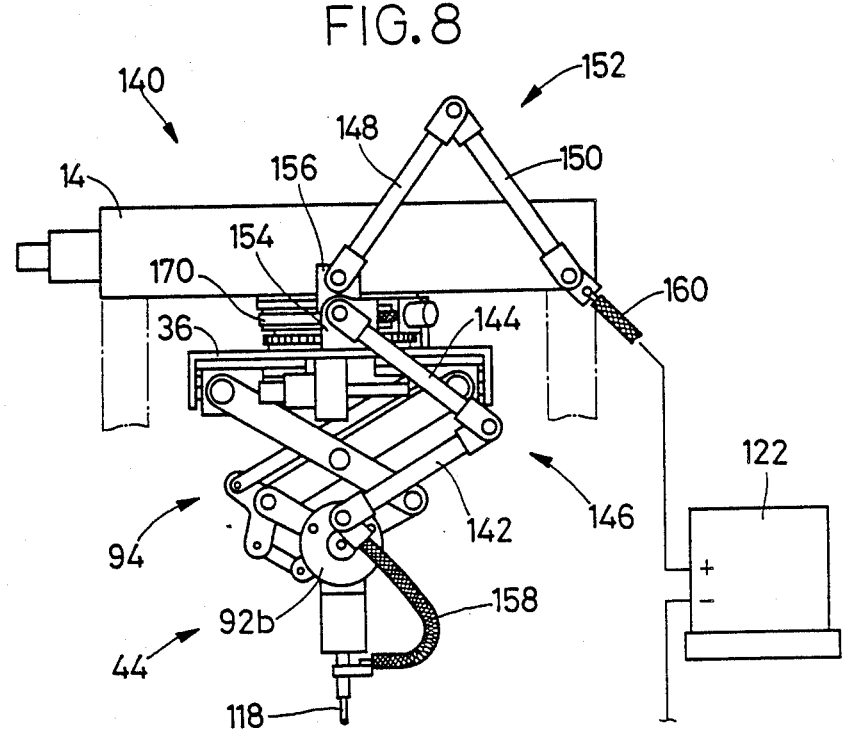
FIG. 8 is a rear elevational view of another embodiment of the robot arm of the invention.
Figure 9:
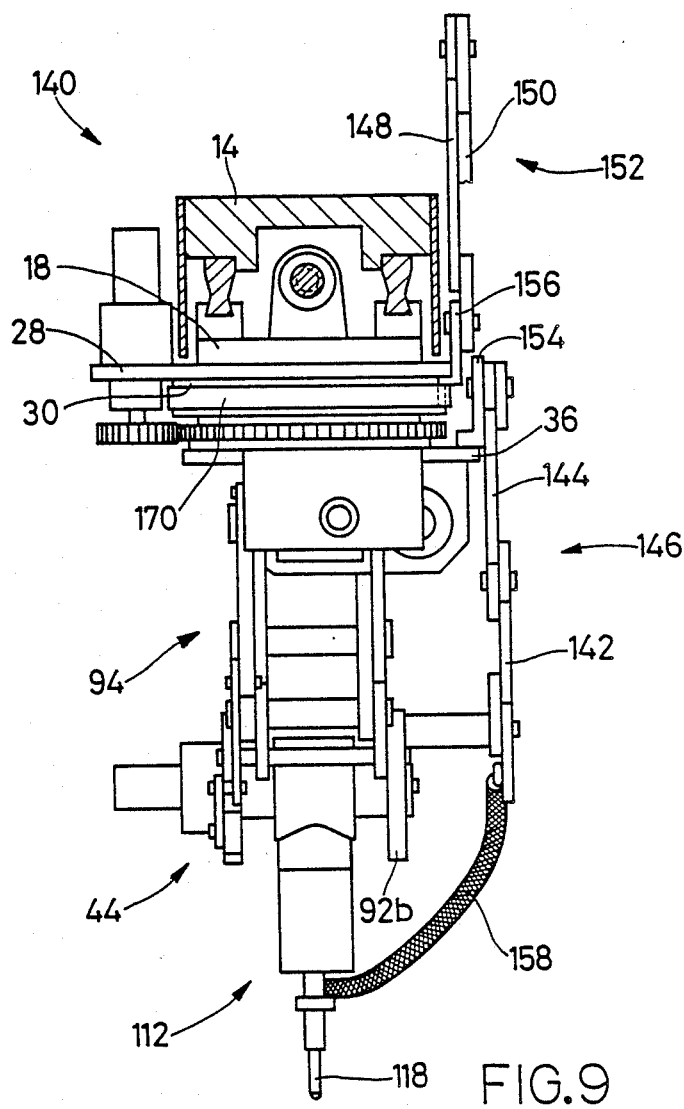
FIG. 9 a right-hand side elevational view of the robot arm of FIG. 8.

Referring to the rear elevational view of FIG. 8 and the righ-hand side elevational view of FIG. 9, there is illustrated a modified welding robot 140, which is different from the robot 10 in the manner in which the movable or upper electrode 118 is electrically connected to the welding tansformer 122. Namely, the present welding robot 140 uses a first conductor device 146 consisting of a pair of electrically conductive bars 142, 144 which are electrically and pivotally connected to each other, and a second conductor device 152 consisting of a pair of electrically conductive bars 148, 150 which are electrically and pivotally connected to each other. The bars 142, 144, 148, 150 are made of a copper alloy or other suitable highly electrically conductive material. The ends of the bars 142, 144 of the first conductor device 146, opposite to the ends at which the bars 142, 144, are connected are respectively attached to the mounting plate 92b and the rotary table 36, pivotally about respective parallel pivot axes perpendicular to the centerline L1 (i.e., parallel to the pivot axes of the linkage 94). The ends of the bars 148, 150 of the second conductor device 152, opposite to the ends at which the bars 148, 150 are connected, are respectively attached to the annular mount 30 and the support structure 14, pivotally about respective parallel axes which are perpendicular to the direction of movement of the slide table 18 (i.e., perpendicular to the plane of FIG. 8). The conductive bar 144 is attached to the rotary table 36 via a bracket 154 fixed to the table 36, while the conductive bar 148 is attached to the annular mount 30 via a bracket 156 fixed to the mount 30.

Figure 10:
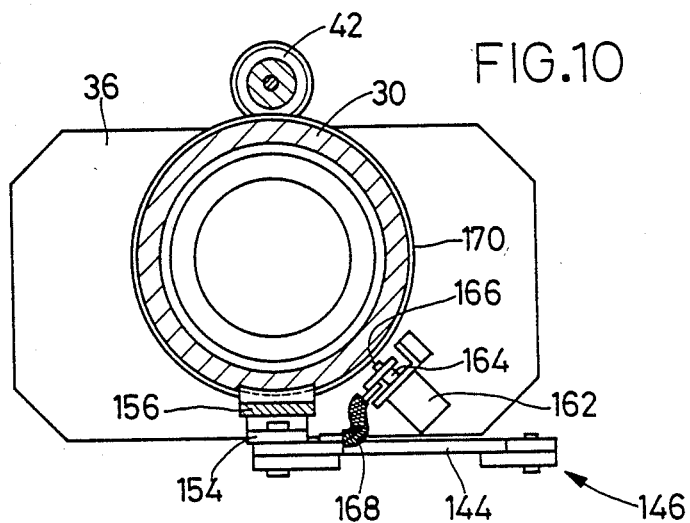
FIG. 10 is a transverse cross sectional view of the robot arm of FIG. 8.

The end of the conductive bar 142 pivotally attached to the mounting plate 92b is electrically connected to the movable electrode 118 by a cable 158, and the end of the conductive bar 150 attached to the slide table 18 is electrically connected to the welding transformer 122 by a cable 160. The end of the conductive bar 144 attached to the rotary table 36 is connected by a cable 168 to a contact 166 attached to an output rod 164 of a switch cylinder 162, as indicated in FIG. 10. The switch cylinder 162 is fixed on the rotary table 36, such that the output rod 166 is opposed to the outer circumferential surface of the annular mount 30. This circumferential surface is covered by an electrically conductive band 170, with a suitable insulator material interposed therebetween. The band 170 is formed of a copper alloy or other highly electrically conductive materials. When the rotary table 36 is not in a rotating motion about its axis L1, the switch cylinder 164 is activated to move the output rod 166 for electrical contact of the cable 168 with the conductor band 170. The band 170 is electrically connected by a suitable cable or other conductor to the conductive bar 148. Thus, the welding current from the transformer 122 is applied to the movable electrode 118, through the cable 160, conductive bars 150, 148, conductive band 170, cable 168, conductive bars 144, 142 and cable 158.

Figure 11:
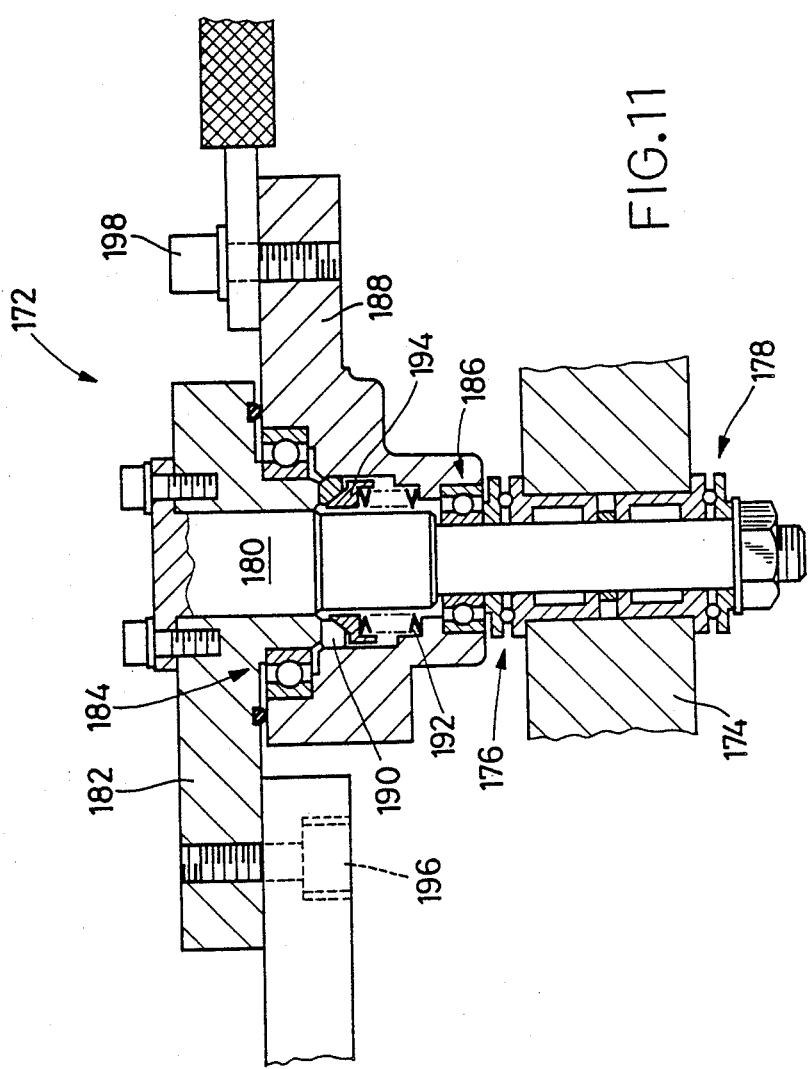
FIG. 11 is an axial elevational view of an example of an electrical fitting device used in the electrical connector system of the embodiment of FIG. 8.

To pivotally attach the electrically conductive bars 142, 144, 148, 150 to the mounting plate 92b, bracket 154, bracket 156 and support structure 14, an electrical fitting device 172 as shown in FIG. 11 by way of example may be suitably used. In FIG. 11, the plate 92b, brackets 154, 156 and support structure 14 are indicated generally as a support 174. The fitting device 172 includes a shaft 180 which is supported via a pair of bearings 176, 178 by the support 174, a terminal 182 secured to the upper end of the shaft 180, and a terminal 188 which is pivotally mounted on the shaft 180 via a pair of bearings 184, 186. The shaft 180 has a length suitably selected depending upon the specific requirement. The terminal 188 is electrically connected to the terminal 182 such that the two terminals 182, 188 are pivotable relative to each other. More specifically, a contact 190 is interposed between the inner circumferential surface of the terminal 188 and the outer circumferential surface of the shaft 180. The contact 190 consists of a plurality of divisions that are spaced apart from each other in the circumferential direction of the shaft 180. The terminal 182 has a portion which is accommodated within the inner circumferential surface of the terminal 188. Between the inner and outer circumferential surfaces of the terminal 188 and shaft 180, there are also provided a coned-disc spring 192 and a presser ring 194 such that the presser ring 194 is biased by the spring 192, against the contact 190, so that the contact 190 is held in pressing contact with the inner circumferential surface of the terminal 188 and the end face of the above-identified portion of the terminal 182. Thus, the terminals 182 and 188 are electrically connected to each other. For example, the terminal 182 is connected to the electrically conductive bar 142 by a screw 196, while the terminal 188 is connected to the cable 158 by a screw 198. If the cable 158 is sufficiently long, the terminal 188 may be eliminated. In this case, the cable 158 is directly connected to one of the terminal 182 and the conductive bar 142 which are electrically connected. It is also possible that the terminals 182, 188 are electrically connected by a cable, rather than by means of the contact 190.

Figure 12:
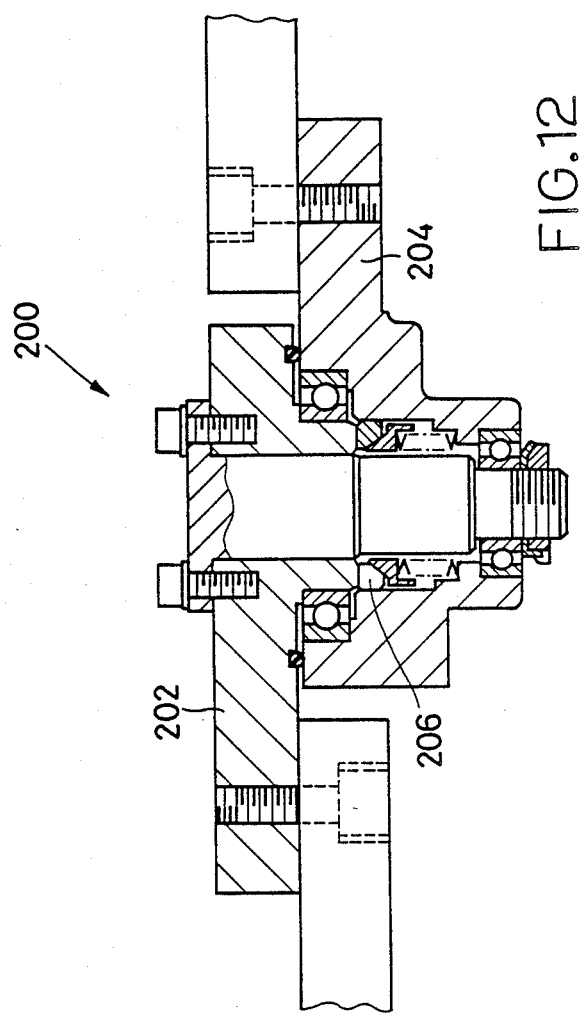
FIG. 12 is an axial elevational view of an example of an electrical connector device also used in the electrical system of the embodiment of FIG. 8.

To electrically and pivotally connect the bars 142 and 144 of the first conductor device 146, and the bars 148 and 150 of the second conductor device 152, an electrical connector device 200 as shown in FIG. 12 by way of example may be suitably used. This connector device 200 is basically similar in construction to the fitting device 172, but the bearings 176, 178 on the shaft 180 for the support 174 provided in the device 172 of FIG. 11 are not provided in the device 200 of FIG. 12. That is, the device 200 has two terminals 202, 204 to which the appropriate bars 142, 144 (148, 150) are electrically connected, and a contact 206 by which the two terminals 202, 204 are electrically connected while permitting the bars 142, 144 (148, 150) to be pivoted relative to each other.

In the present welding robot 140 constructed as described above, only the lengths of the cables 158 and 160 for electrical connection of the movable electrode 118 to the transformer 122 may be comparatively short. Further, since the cables 158, 160 are connected between the members whose relative movement distances are relatively small, the paths of the cables may be relatively easily selected, and the cables are less likely to interfere with the other components of the robot 140 or exert an excessive force on the movable electrode 118, during operation of the robot.

Figure 13:
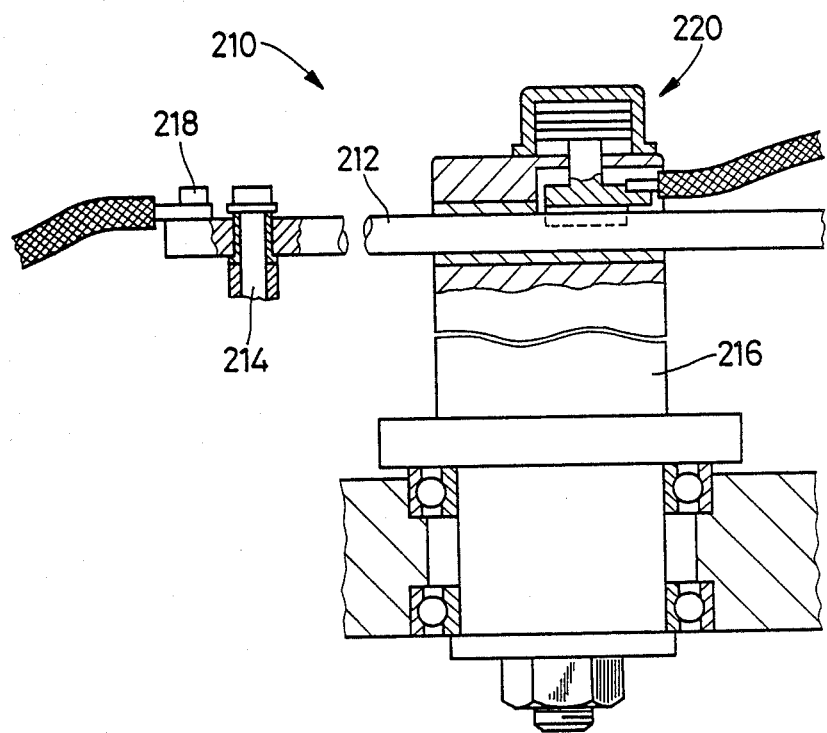
FIG. 13 is a cross sectional view of a comparative electrical connector device for the robot arm of FIG. 8.

Moreover, the first and second conductor devices 142, 152 are bent at their intermediate pivotal joints when the parallelogram linkage 94 is expanded or contracted or the slide table 18 is reciprocated. In other words, the conductive bars 142, 144, 148, 150 of the devices 146, 152 will not project by such a large amount as to cause an interference with the other components. If an electrical connector device 210 as shown in FIG. 13 by way of example is used, there may arise an interference between an electrical conductor and the other components of the robot. More specifically, the electrical connector device 210 includes an electrical conductive bar 212 which is pivotally attached at its one end to the mounting plate 92b, for instance, by means of a pin 214 fixed on the plate 92b. The other end portion of the bar 212 axially slidably engages a pivot member 216 which is supported by the bracket 154, for example, pivotally about an axis parallel to the pin 214. The bar 212 is electrically connected at the above-indicated one end to the cable 158, for example, by a screw 218, and at the other end to the cable 168, for example, by means of a switch cylinder 220 provided on the pivot member 216. In this case, the above-indicated end portion slidably engaging the pivot member 216 may project a large distance and may interfere with the other members. If no interference of the bar 212 occurs, the connector device 210 may be utilized, for the robot 10, 140.

Figure 3:
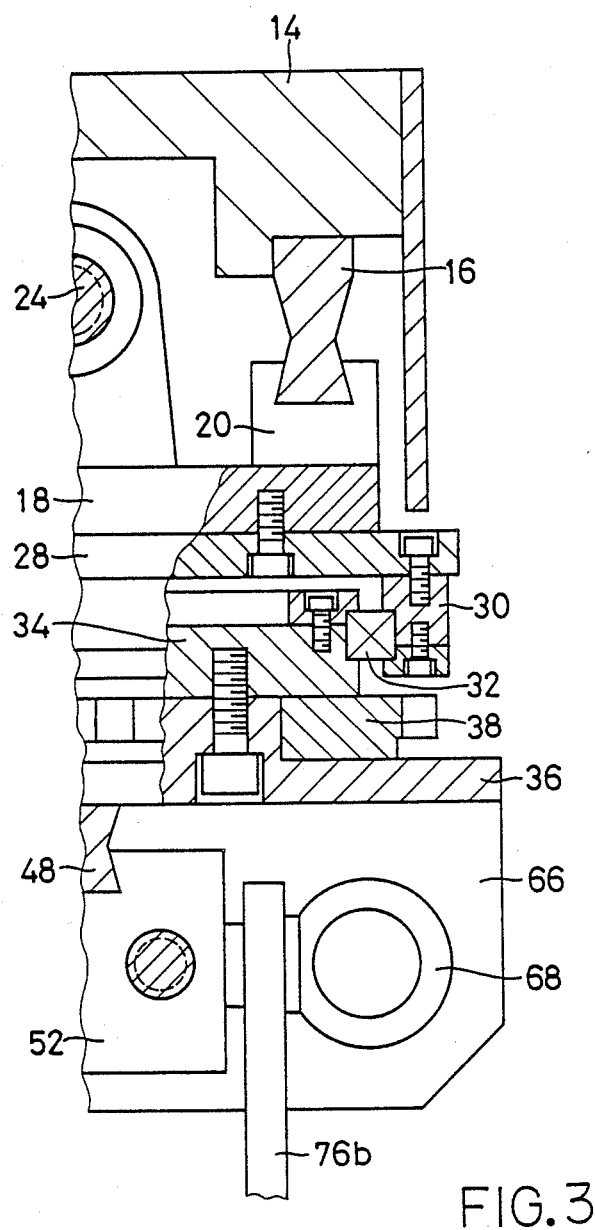
FIG. 3 is a fragmentary enlarged view of FIG. 2.
Figure 14:
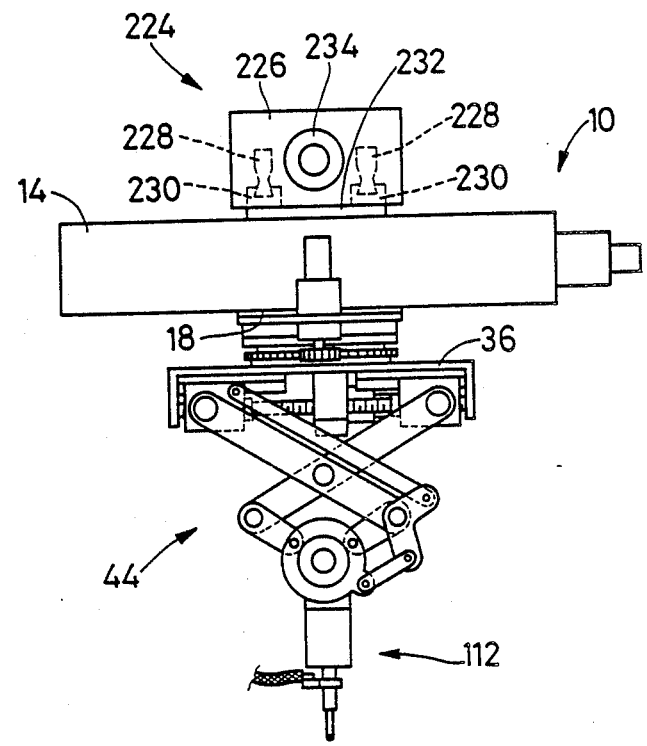
FIG. 14 is a front elevational view showing a further embodiment of the invention.

A further modified embodiment of the invention is illustrated in FIG. 14, wherein the support structure 14 constructed as shown in FIGS. 1-3 is mounted on a positioning device 224, rather than secured to the main frames 12. In the robot 10 of FIG. 14, the positioning device 224 permits the robot arm 44 to be moved in a direction perpendicular to the direction of movement of the slide table 18, i.e., in the direction perpendicular to the plane of FIG. 14. In other words, the rotary table 36 is movable along two mutually perpendicular axes in the horizontal plane perpendicular to the rotation axis L1. This modified robot 10 is suitably used where the welding positions or portions exist over a relatively wide area in the horizontal plane. The positioning device 224 is secured to suitable main frames (similar to the frames 12 used in the embodiment of FIG. 1), and includes a support sructure 226 which has a pair of linear guides 228 for slidably supporting and guiding a slide table 232 via bearings 230, in the direction perpendicular to the direction of movement of the slide table 18. The slide table 232 is reciprocated by a drive motor 234 via a nut and a ballscrew as used for the slide table 18. The support structure 14 is mounted on the slide table 232.

Figure 15:
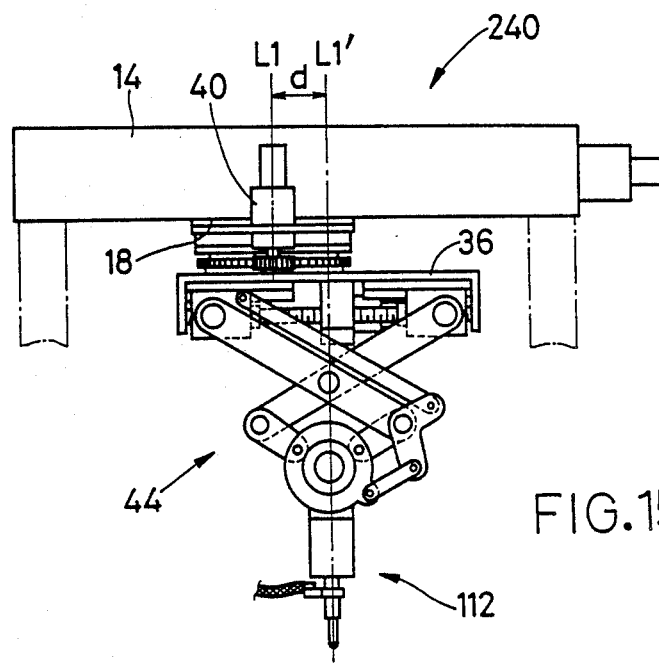
FIG. 15 is a front elevational view showing a still further embodiment of the invention.

Referring next to FIG. 15, there is illustrated a further modified embodiment of the invention in the form of a welding robot 240, wherein the rotary table 36 is mounted on the mounting plate 34 (see FIG. 3) such that the rotation axis L1 of the rotary table 36 is offset from the centerline L1' of the robot arm 44, by a distance "d". In this arrangement, a rotary movement of the rotary table 36 by the drive motor 40 will cause the robot arm 44 and the stud gun 112 attached thereto to be rotated about the rotation axis L1, along a circle whose center is located on the axis L1 and whose radius is equal to "d". This embodiment also provides a comparatively wide welding area, particularly in the direction perpendicular to the direction of movement of the slide table 18, without the use of a positioning device as indicated at 224 in FIG. 14. In the present embodiment, the centerline L1' defines a straight line along which the robot arm 44 is expanded and contracted.

Figure 16:
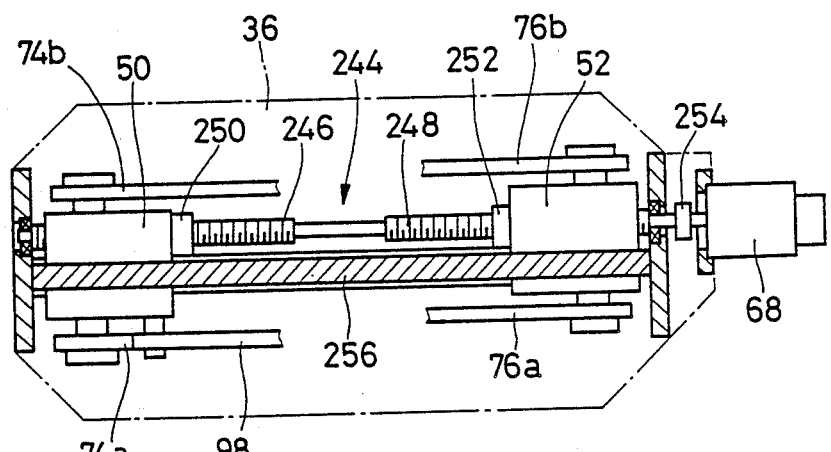
FIG. 16 is a cross sectional view corresponding to that of FIG. 4, illustrating a modified form of a device for moving the driving blocks, which is alternative to the device used in the embodiment of FIG. 1.

FIG. 16 illustrates a modified device for moving the two driving blocks 50, 52 toward and away from each other. Unlike the device shown in FIG. 4 using the two ballscrews 58, 60, the present device uses a single feedscrew 244 which has a right-hand and a left-hand threaded portion 246, 248. These threaded portions 246, 248 engage a right-hand and a left-hand nut 250, 252 secured to the respective driving blocks 50, 52. This arrangement allows the driving blocks 50, 52 to be moved toward and away from each other when the feedscrew 244 is bidirectionally rotated by the drive motor 68. The output shaft of the drive motor 68 is connected to the feedsrew 244 through a coupling 254, without transmission gears as indicated at 62, 64, 70 in FIG. 4. Thus, the present arrangement does not suffer from a positioning error of the driving blocks 50, 52 due to a backlash of such transmission gears. The driving blocks 50, 52 are guided by a single linear guide 256. This is possible in the absence of the gearbox 66 having the gears 62, 64, 66.

Figure 17:
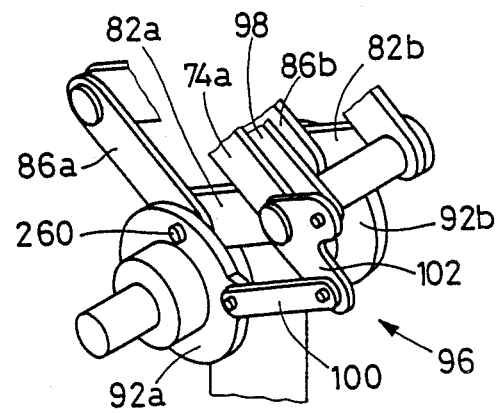
FIG. 17 is a perspective view corresponding to that of FIG. 5, depicting a modified arrangement of the distal portion of the robot arm, which is alternative to that of the robot arm of FIG. 1.

Referring to FIG. 17, there is shown a further modified embodiment of the invention, wherein a single pin 260 is used for pivotally connecting the two pairs of distal links 82a-86 a and 82b-86 b to the movable member 92a, 92b (mounting plates). In this embodiment, too, the posture of the movable member 92a, 92b is maintained by the pivoting mechanism 96 while the movable member is reciprocated. The second auxiliary link bar 100 of the pivoting mechanism 96 is pivotally connected to the connecting lever 102 and the mounting plate 92a such that the auxiliary link bar 100 is parallel to the distal link bar 82a of the parallelogram linkage 94. The centerline of the pin 260 serves as a third pivot axis about which the distal link bars 82a, 86a, 82b, 86b are pivoted relative to the movable member 92a, 92b. In this case, therefore, only one third pivot axis exists, contrary to the two third pivot axes L5 and L6 provided in the first embodiment of FIG. 1.

While the present invention has been described in its presently preferred embodiments referring to the accompanying drawings, with a certain degree of particularity, it is to be understood that the invention is not limited to the details of the illustrated embodiments, but may be otherwise embodied.

For instance, the pantograph type robot arm 44 according to the invention may be used for robots for various applications, other than for welding operations as in the illustrated embodiments.

Although the illustrated robot arm 44 is adapted to be expanded in the downward direction, the direction of expansion (and contraction) may be changed as needed.

In the illustrated embodiments, the parallelogram linkage 94 consists of the two pairs of proximal link bars 74a-76 a and 74b-76 b and the two pairs of distal link bars 82a-86 a and 82b-86 b. However, the distance of expansion and contraction of the linkage 94 may be increased by adding intermediate link bars connected between the proximal and distal link bars.

Further, the linkage 94 may consist of three or more pairs of proximal link bars and three or more pairs of distal link bars, which are spaced apart from each other in the direction parallel to the third pivot axis or axes (L5, L6, 260). It is also possible that the linkage 94 consists of one pair of proximal link bars and one pair of distal link bars, under some operating conditions of the robot arm, or where the linkage 94 has a sufficient mechanical strength.

In the illustrated embodiments, the pivoting mechanism 96 is arranged such that the auxiliary link bars 98, 100 are parallel to the proximal and distal link bars 74a, 82a. However, the mechanism 96 may be modified such that the auxiliary link bars 98, 100 are parallel to the proximal and distal link bars 76a, 86a. Further, two pairs of pivoting mechanisms may be provided such that one pair of auxiliary link bars is parallel to the link bars 74a, 82a while the other pair of auxiliary bars is parallel to the link bars 76a, 86a.

The pivoting mechanism 96 may be replaced by other mechanisms, for example, a gearing mechanism wherein a first gear attached to the end of the proximal link bar 74a coaxially with the pin 80, and a second gear which has the same number of teeth as the first gear and which is attached to the mounting plate 92a coaxially with the pin 88 or 260, are connected to each other, by an odd number of intermediate gears which are supported freely rotatably on the distal link bar 82a.

While the conductor devices 146, 152 are adapted such that the electrically conductive bars 142, 144, or 148, 150 are pivoted relative to each other in a plane, the conductive bars may be universally connected to each other by a suitable three-dimensional joint such as a ball joint.

It will be understood that the invention may be embodied with various other changes, modifications and improvements, which may occur to those skilled in the art, without departing from the sprit and scope of the invention defined in the following claims.

What is claimed is:

1. A pantograph type robot arm having a plurality of link bars linked together so as to be expanded and contracted in a direction along a straight line, comprising:
   a support member;
   a pair of driving blocks which are supported by said support member movably in a direction perpendicular to said straight line, toward and away from each other, such that said driving blocks are positioned symmetrically with each other with respect to said straight line during movements thereof;
   a linkage having said plurality of link bars, said plurality of link bars comprising a pair of proximal link bars and a pair of distal link bars, each of said proximal link bars being connected at one end thereof to a corresponding one of said pair of driving blocks such that said proximal link bars are pivotable about respective first pivot axes which are perpendicular to the direction of movements of said driving blocks and perpendicular to said straight line, said proximal link bars being connected at intermediate portions thereof to each other pivotally relative to each other about a second pivot axis parallel to said first pivot axes, each of said distal link bars being pivotally connected at one end thereof directly or indirectly to a corresponding one of the other ends of said proximal link bars, respectively, the other ends of said distal link bars being moved toward and away from said support member in the direction along said straight line, when said pair of driving blocks are moved toward and away from each other;
   a movable member connected to the other ends of said pair of distal link bars of said linkage, pivotally about at least one third pivot axis parallel to said first pivot axes; and
   a pivoting mechanism associated with one of said distal link bars of said linkage and said movable member, for effecting a relative pivotal movement of said one distal link bar and said movable member about one of said at least one third pivot axis, by an angle equal to an angle of pivotal movements of said one distal link bar about said one third pivot axis, in a direction opposite to a direction of said pivotal movements of said one distal link bar.

2. A pantograph type robot arm according to claim 1, wherein said pivoting mechanism includes a plurality of auxiliary link bars associated with at least one of said driving blocks, said linkage and said movable member, said auxiliary link bars being disposed parallel to respective ones of said proximal and distal link bars of said linkage.

3. A pantograph type robot arm according to claim 1, further comprising a pair of electrically conductive bars which are electrically and pivotally connected at one end thereof to each other, and at the other ends thereof to said support member and said movable member, respectively, whereby an electric connection between said support member and said movable member is made by said pair of electrically conductive bars.

4. A pantograph type robot arm according to claim 1, wherein said straight line extends substantially in a vertical direction, and said other ends of said distal link bars of said linkage are movable away from said support member in a downward direction.

5. A pantograph type robot arm according to claim 1, wherein said movable member has a presser cylinder fixed thereto, said presser cylinder including an output rod which is substantially alignable with said straight line and which is movable in a direction substantially parallel to said straight line, for applying a pressure to a workpiece.

6. A pantograph type robot arm according to claim 5, further comprising means for pivoting said cylinder about an axis lying on and perpendicular to said straight line, so that said output rod is pivotable over a predetermined angular range in a plane whicn includes said straight line and which is perpendicular to said first pivot axes.

7. A pantograph type robot arm according to claim 5, further comprising a movable electrode fixed to said output rod of said presser cylinder, and a stationary electrode which cooperates with said movable electrode to grip two workpieces therebetween, for welding said two workpieces.

8. A pantograph type robot arm according to claim 1, further comprising rotary drive means for rotating said support member about said straight line, and linear drive means for moving said support member in a direction perpendicular to said straight line.

9. A pantograph type robot arm according to claim 1, further comprising drive means for rotating said support member about said straight line, and linear drive means for moving said support member in mutually perpendicular directions in a plane perpendicular to said straight line.

10. A pantograph type robot arm according to claim 1, further comprising rotary drive means for rotating said support member about an axis which is parallel to and offset from said straight line, and linear drive means for moving said support member in a direction perpendicular to said straight line.

11. A pantograph type robot arm according to claim 1, further comprising drive means for moving said pair of driving blocks toward and away from each other, said drive means including a pair of externally threaded shafts which extend in the direction perpendicular to said straight line and which engage said pair of driving blocks, respectively, and means for rotating said externally threaded shafts in opposite direction at a same speed.

12. A pantograph type robot arm according to claim 1, further comprising drive means for moving said pair of driving blocks toward and away from each other, said drive means including a feedscrew which extends in the direction perpendicular to said straight line, said feedscrew having two spaced-apart right-hand and left-hand threaded portions which engage said pair of driving blocks, respectively, said drive means further including means for bidirectionally rotating said feedscrew.

13. A pantograph type robot arm according to claim 1, further comprising a pair of pins by which said other ends of said distal link bars of said linkage are pivotally connected to said movable member, said pair of pins providing two pivot axes as said at least one third pivot axis.

14. A pantograph type robot arm according to claim 1, further comprising a single pin by which said other ends of said distal link bars of said linkage are pivotally connected to said movable member, said single pin providing one pivot axis as said at least one third pivot axis.

15. A pantograph type robot arm according to claim 1, wherein said plurality of link bars of said linkage consist of two pairs of proximal link bars each pair constructed as defined in claim 1, and two pairs of distal link bars each pair constructed as defined in claim 1, said two pairs of proximal link bars being spaced apart from each other in a direction parallel to said first pivot axes, and said two pairs of said distal link bars being spaced apart from each other in the direction parallel to said first pivot axes, said two pairs of proximal link bars being pivotally connected to said driving blocks and said two pairs of distal link bars, and said two pairs of distal link bars being pivotally connected to said movable member.

16. a pantograph type robot arm according to claim 15, wherein said pivoting mechanism includes a first auxiliary link bar connected at one end of one of said pair of driving blocks, a second auxiliary link bar connected at one end to said movable member, and a connecting lever which is pivotally supported by said other end of one of said one pair of proximal link bars, said first auxiliary link bar being pivotally connected at the other end thereof to one end of said connecting lever while said second auxiliary link bar being pivotally connected at the other end thereof to the other end of said connecting lever, such that said first auxiliary link bar is parallel to said one proximal link bar of said one pair of proximal link bars while said second auxiliary link bar is parallel to one of said one pair of distal link bars to which said one proximal link bar is pivotally connected.

* * * * *